United States Patent
Deffner

(10) Patent No.: US 7,207,162 B2
(45) Date of Patent: Apr. 24, 2007

(54) CHIN CHAIN

(75) Inventor: Karin Deffner, Fischbachau (DE)

(73) Assignee: Airbus Deutschland GmbH, Hamburg (DE)

( * ) Notice: Subject to any disclaimer, the term of this patent is extended or adjusted under 35 U.S.C. 154(b) by 0 days.

(21) Appl. No.: 11/245,844

(22) Filed: Oct. 7, 2005

(65) Prior Publication Data

US 2006/0096255 A1 May 11, 2006

Related U.S. Application Data

(63) Continuation of application No. PCT/EP04/02418, filed on Mar. 9, 2004.

(51) Int. Cl.
*B68B 1/04* (2006.01)

(52) U.S. Cl. ............................................. 54/6.1; 59/78

(58) Field of Classification Search .................. 54/6.1, 54/6.2; 59/78, 82, 90, 92; 63/4
See application file for complete search history.

(56) References Cited

U.S. PATENT DOCUMENTS

| 896,164 | A | * | 8/1908 | Schreiter | ........................ | 54/24 |
|---|---|---|---|---|---|---|
| 1,054,593 | A | | 2/1913 | Mills | | |
| 2,025,469 | A | * | 12/1935 | Miller | ........................... | 54/6.1 |
| 2,163,208 | A | * | 6/1939 | Moody et al. | .................... | 63/4 |
| 2,196,686 | A | * | 4/1940 | Stahl | .............................. | 59/78 |
| 3,181,257 | A | * | 5/1965 | Larsen | ......................... | 37/398 |
| 3,751,877 | A | * | 8/1973 | Morgan | ......................... | 54/6.1 |
| 4,798,043 | A | * | 1/1989 | Wyse | .............................. | 54/6.1 |
| 2001/0037628 | A1 | | 11/2001 | Robart et al. | | |

FOREIGN PATENT DOCUMENTS

| DE | 361479 | 10/1922 |
|---|---|---|
| GB | 371180 | 4/1932 |
| WO | WO 00/43312 | 7/2000 |

* cited by examiner

*Primary Examiner*—Robert P. Swiatek
(74) *Attorney, Agent, or Firm*—Christopher Paradies; Fowler White Boggs Banker P.A.

(57) ABSTRACT

A chin chain for bits/bridles used in equestrian sports (e.g. curb bits) has a first chain element and a second chain element. The first element has members formed of loops that are twisted in one direction, and the second element has members formed of loops that are twisted in the opposite direction. The first element and the second element are linked by at least one connecting ring and are capable of being connected to the bridle.

10 Claims, 3 Drawing Sheets

US 7,207,162 B2

CHIN CHAIN

RELATED APPLICATIONS

The present application is a continuation of PCT patent application Serial No. PCT/EP2004/002418, filed Mar. 9, 2004 claiming priority of the German Patent Application Serial No. 103 16 525.8, filed Apr. 10, 2003, incorporated herein by reference in their entirety.

FIELD OF THE INVENTION

The field relates to chin chains for horses.

BACKGROUND OF THE INVENTION

A bridle, such as a curb bridle, makes it possible for the advanced rider to give finer assistance to a suitably trained horse. In the bridle of trained dressage horses, the curb bit usually consists of two bits so that the rider needs to handle two pairs of reins at the same time. The chin chains usually used today, for example, in a curb bridle, consist of a plurality of oval rings which taper towards the ends and nestle into one another. A small, round ring located at the centre of the chin chain, called a lip strap ring, was historically used to buckle on the so-called lip strap which was intended to prevent any slippage if a chin chain was not of suitable length (this is almost of no importance today). The chin chain which is always to be turned out to the right is suspended in the adjacent chin chain hooks from above and specifically from inside on the right side and from outside on the left side. Its correct bending or flexibility has a substantial influence on a good bridle and action.

The chin chains usually used today for curb bits have the disadvantage that the members twist easily so that individual members are positioned upright and press onto the lips of the horse if they have not been turned outwards very carefully each time before putting on.

The German Federal Patent 361479 discloses a chin chain for curb bits where each member is provided with an eye through which the neighbouring member can be inserted so that the members cannot twist. In addition, this patent specification discloses the design of chin chain such that every two neighbouring members are rigidly connected one to the other instead of in an articulated fashion.

Chin chains consisting only of members or chain elements which can be turned out to the right, i.e., chin chains whose linkage of the individual members is in the same direction over the entire length of the chain, effect a nonuniform pull on the two sides of the curb bit and the pull has the effect that the linkage of the individual members acting in the same direction has a lever effect on the chin chain hooks located to the right and left of the horse's mouth with the effect that in general the left chin chain hook is pulled away from the mouth and the right chin chain hook is pulled towards the mouth As a result of this different action of forces on the two hooks or corners of the mouth (outward on the left, inward on the right), on the one hand a different lever effect is achieved on the curb bit in the horse's mouth More pressure is exerted on the tooth float blade and on the lip on the right than on the left. At the same time, attention should be paid to the effects on the horse's mouth or the corner of the mouth which are produced by the pull inward onto the right chin chain hook. This can frequently be observed as a lip which droops on one side on the right side of the horse's mouth. In addition, this frequently results in injuries to the corner of the mouth as far as tongue defects, such as a pushing out of the tongue for example.

SUMMARY OF THE INVENTION

According to an exemplary embodiment, a chin chain comprising a first chain element and a second chain element is provided. The first chain element comprises at least one first member and the second chain element comprises at least one second member. A first area of the at least one first member is twisted in a first direction from a first plane of the at least one first member. A second area of the at least one second member is twisted in a second direction from a second plane of the at least one second member. The first direction is opposite from the second direction.

A chin chain may be provided which has a first chin chain element which is to be turned out to the right and it has a second chin chain element which is to be turned out to the left. A chin chain may have a first and a second chain element wherein the chain members are respectively oppositely directed in the first and the second chain element. In this way, a force which is exerted on the chin chain is uniformly guided onto the left and right side of the curb bit. Thus, a different one-sided lever effect, namely increased pressure towards the right on the curb bit is eliminated. In addition, the pull inward onto the right chin chain hook is thereby compensated or eliminated. Thus, the chin chain may act advantageously against a lip to avoiding drooping on one side, injuries to the corner of the mouth and tongue defects.

BRIEF DESCRIPTION OF THE DRAWINGS

Some examples are illustrated in the drawings. Exemplary embodiments of the present invention are shown in the drawings and explained in detail in the detailed description.

DETAILED DESCRIPTION OF THE PREFERRED EMBODIMENT

The drawings and this detailed description provide some example of the present invention, which should not be used to limit the scope of the claims that issue.

Figure 1:
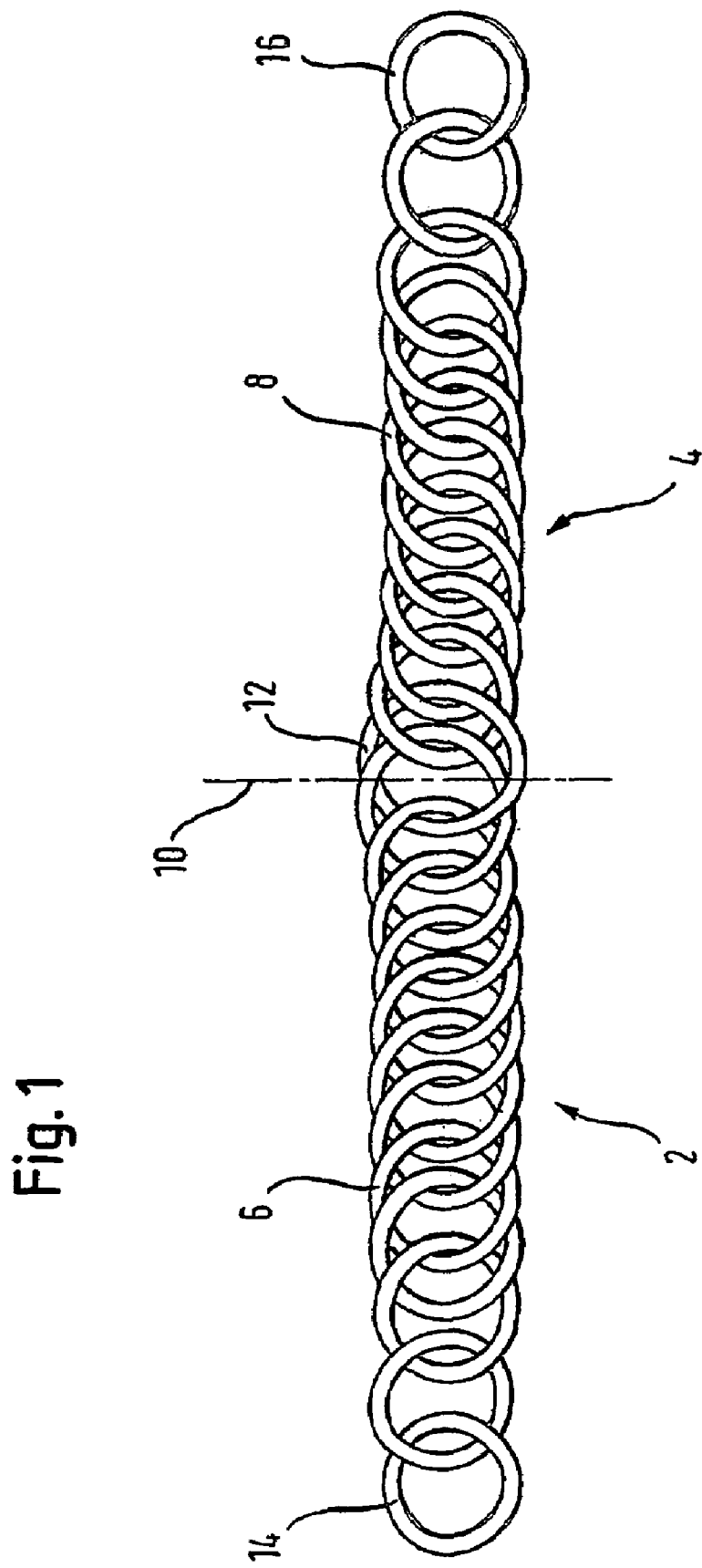
FIG. 1 shows a three-dimensional view of an exemplary embodiment of a chin chain.

FIG. 1 shows a three-dimensional view of one example of a chin chain for a curb bit. The chin chain shown in FIG. 1 comprises a first chain element 2 and a second chain element 4. The first chain element 2 comprises a plurality of first members 6. The second chain element 4 comprises a plurality of second members 8. Each of the members 6,8 may be a link in the elements 2,4 of the chin chain. The first members 6 of the first chain element 2 are linked to the right, i.e. turning out to the right-hand direction, and the second members 8 of the second chain element 4 are linked to the left, i.e., turning out to the left-hand direction. In other words, the first members 6 of the first chain element 2 are configured such that they have an area which is twisted out from a plane of the member. Likewise, the members 8 of the second chain element are configured such that they have an area which is twisted out from the plane of the respective member. The twisting of the members 8 of the second chain element 4 is oppositely directed to the twisting of the members 6 of the first chain element 2.

The reference number 10 designates a mid-point line of symmetry of the chin chain. If the left part of the chin chain comprising the first chain element 2 is considered, this left part of the chin chain exactly corresponds to a left part of a traditional chin chain. In contrast to the traditional chin chain; however, the right part, i.e. the part to the right of the mid-point line 10 is configured with a linkage in the opposite direction of linkage. Thus, the area to the left of the line of symmetry 10 has a rightwardly out-turning linkage whereas the area to the right of the line of symmetry 10 has a leftwardly out-turning linkage.

In the area encompassing the mid-point line 10 are a pair of connecting members 12 to connect the first chain element 2 to the second chain element 4. Members 14,16 may be suspended in a curb bit and are provided at the ends of the first chain element 2 and the second chain element 4, respectively. For example, a pair of links are connected one to the other and to the first and second chain elements 2,4.

It can also be deduced from FIG. 1 that the members 6 and 8 are each linked such that in the first chain element 2 and the second chain element 4 there are respectively areas in which three neighbouring members are suspended through each of the other members 6,8. This type of linkage is now described further with reference to FIGS. 2 and 3, for example.

Figure 2:
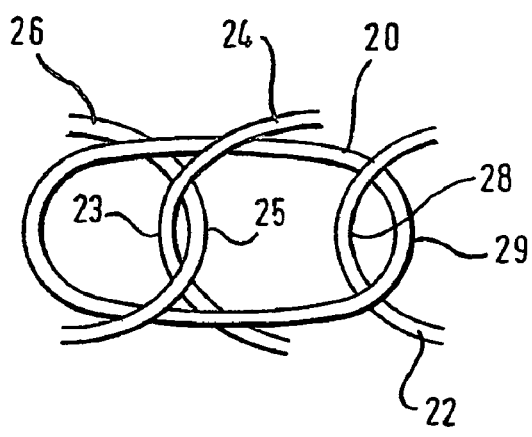
FIG. 2 shows a plan view of a member of a first chain element.
Figure 3:
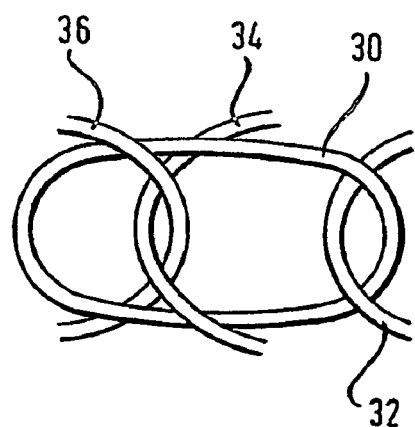
FIG. 3 shows a plan view of a member of a second chain element.

FIG. 2 shows a three-dimensional plan view of a first member 20 of the first chain element 2 and FIG. 3 shows a three-dimensional plan view of a member 30 of the second chain element 4. As illustrated in FIG. 2, a portion of three neighbouring members 22, 24 and 26 are suspended in and pass through the illustrated member 20. The members 22 and 24 extend to the right and the member 26 extends to the left. The member 22 is suspended in the member 20 such that an end area 28 which can be provided with a thickening comes to rest directly on an end area 29 of the member 20 under loading. The member 24 is likewise suspended in the member 28. When the members 24 and 26 are under load, an area 25 of the member 26 which is configured as an end area and may be thickend, rests on an end area 23 of the member 24 which likewise may have a localized thickening. The member 22 is suspended in the member 20 such that the upper area of the member 22 goes over the member 20 whereas the lower area of the member 22 goes over the member 20 whilst the lower area of the member 22 passes through under the member 20. The member 24 is thus suspended in the member 20 and the member 26 such that an upper area of the member 24 goes over the member 20, then goes over the member 26 and then the lower area of the member 24 passes through under the member 25 and under the member 20. The member 26 is thus suspended in the members 20 and 24 so that the upper area passes through under the member 20, passes through under the member 24 and then lies in the lower area above the member 24 and in its lower area over the member 20.

In FIG. 3, three members 32, 34 and 36 are suspended in the member 30. The member 32 is suspended in the member 30 such that in the upper area it runs through under the member 30 in the perspective in FIG. 3 but in the lower area runs over the member 30. The member 34 and the member 36 are thus linked to the chain 30 so that the member 36 is also suspended in the member 34 or the member 34 is suspended in the member 36. The direction in which the members 34 and 36 are suspended in the member 30 can be deduced from FIG. 3. According to FIG. 3, the member 36 is suspended such that in its upper area it runs over the member 30 and over the member 34 but in its lower area runs under the members 34 and 30. The member 34 is linked to the members 30 and 36 so that in the perspective of FIG. 3, in its upper area it runs under the member 30 and the member 36 but in its lower area however runs over the member 36 and the member 30. The members 20, 22, 24, 26, 30, 32, 34, 36 may be provided with thickenings at their contact surfaces, which may be used to increase the strength and resistance to wear, for example. The members 20, 22, 24, 26, 30, 32, 34, 36 are depicted as ovals in FIGS. 2 and 3; however, the members may be oval, round, ellipsoidal or any other shape suitable for linking one to the other in the manner shown. Such thickenings may originate from welded seams or brazed joints or by the process used to forge the links, for example.

Figure 4:
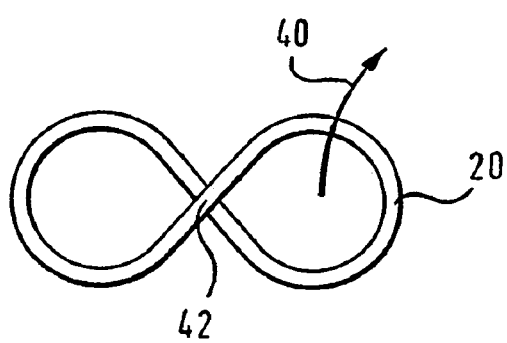
FIG. 4 shows a side view of the member from FIG. 2.

FIG. 4 shows a side view of the member 20 of FIG. 2 that is rotated ninety degrees from the orientation shown in FIG. 2. The member 20 has a twist to the left, which is not apparent in FIG. 2. This is indicated by the directional arrow 40.

A flat link may be formed that is not twisted. Then, the flat link may be twisted either to the left or the right to form a member 20, 30. A flat link has a plane that passes through the loop of material forming the link. A member 20, 30 is formed by twisting the link such that an area of the link is turned out from this plane. A member 20 may be used for the first chain element 2, such that in the side view a central area 42 runs from bottom left to top right, i.e. is linked to the right. In this position the member 20 in the first chain element 2 is linked to the other chain members as shown in FIG. 2.

Figure 5:
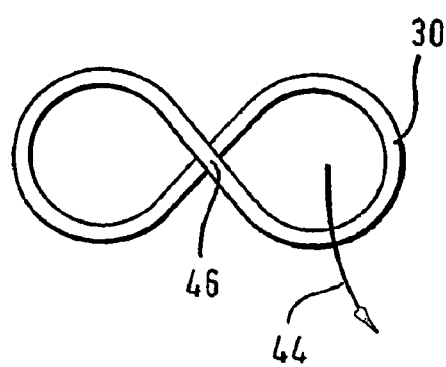
FIG. 5 shows a side view of the member from FIG. 3.

FIG. 5 shows a one-dimensional side view of the chain element 30 from FIG. 3. As shown by the directional arrow 44, the member 30 is the opposite direction from member 20. This means that in the side view shown in FIG. 5 a front middle area runs from top left to bottom right. A comparison of the two types of members 20, 30 as shown in FIGS. 4 and 5 is useful to illustrate the difference between the present invention and a commercially available chin chain. The front middle area 42 of member 20 has a positive gradient compared to the negative gradient of the front middle area 46 of member 30. The members 20, 30 may be similarly linked but have an opposite twist direction in the two chain elements 2 and 4.

A chin chain according to the drawings advantageously provides an equal-sided action of force on the two hooks or corners of the mouth. An identical lever effect of the curb bits in the horse's mouth is thereby achieved so that the pressure on the tooth float blade and the lip on the right is the same as the pressure on the tooth float blade or the lip on the left. In addition, when the chin chain is under load, the load is uniformly diverted to both sides. Advantageously, this arrangement avoid discomfort and damage to the horse, such as a lip which droops on one side, injuries to the corner of the mouth and tongue defects.

The chin chain shown in FIGS. 1 to 5 is advantageously used in conjunction with a commercially available rubber underlay which is also used with a traditional chin chain. Advantageously in conjunction with the rubber underlayer, any twisting of the individual chain members is prevented and thus, any injury to the horse caused by twisting of the individual chain members is prevented.

Figure 6:
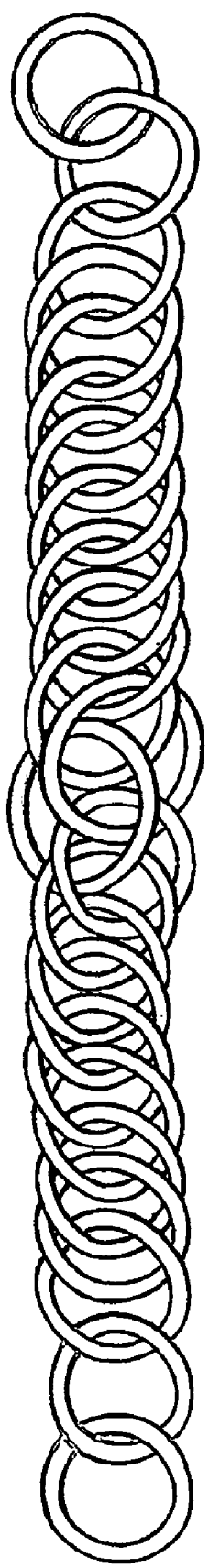
FIG. 6 shows a three-dimensional view of another example of a chin chain.

FIG. 6 shows a three-dimensional view of another example of a chin chain that may be used in a bridle, such as a curb bridle, for example. The opposite twisting of the chain elements of the left chain element and the right chain is illustrated. The chin chain described and shown in the drawings may be used for bridles; for dressage horses or for draught horses that pull a cart.

The first members and the second members may be made of a brass, a copper, a stainless steel or an iron, for example. Also, combinations of these materials and other materials may be used to form the members. For example, the members may be chromed, plated or otherwise coated with a surface layer that is different than the core of the members. This surface layer may be applied merely for aesthetic reasons or may be used to reduce wear or to resist oxidation, discoloration or corrosion.

What is claimed is:

1. A chin chain for a bridle, comprising: a first chain element having a plurality of first members, each first member being formed of a loop having a link plane and each first member being linked to other first members in the first chain element; a second chain element having a plurality of second members, each second member being formed of a loop having a link plane and being linked to other second members in the second chain element; wherein the first members are twisted in a first direction from the link plane, and the second members are twisted in a second direction from the link plane, the second direction being opposite of the first direction, and the first chain element and the second chain element are linked to form the chin chain.

2. The chin chain according to claim 1, wherein the first chain element and the second chain element each have a free end that is capable of being connected to the bridle.

3. The chin chain according to claim 1, wherein the first element and the second element are linked such that, when the chin chain is attached to the bridle, a force which acts on the chin chain is transferred substantially equally on both a left side and a right side of a bit.

4. The chin chain according to claim 1, wherein the first members of the first element and the second members of the second element are linked such that, when the chin chain is attached to the bridle and forces are applied to the bridle, torsional forces acting on the first members in the first element are substantially cancelled by torsional forces acting on the second members in the second element.

5. The chin chain according to claim 1, wherein at least one connecting ring connects the first element and the second element.

6. The chin chain according to claim 1, wherein the first element is comprised of at least four first members, and one of the at least four first members has three of the other at least four members passing through the loop of the one of at least four first members; and wherein the second element is comprised of at least four second members, and one of the at least four second members has three of the other at least four second members passing through the loop of the one of the at least four second members.

7. The chin chain according to claim 6, wherein the loop of the one of the at least four first members and the loop of the one of the at least four second members each have portions of the loop with an increased thickness, the portions of the loop with an increased thickness being disposed at points of contact with other of the at least four first members and the at least four second members that make contact with the one of the at least four first members and the one of the at least four second members, respectively.

8. The chin chain according to claim 1, wherein material of the first members and the second members are of a brass, a copper, a stainless steel or an iron.

9. The chin chain according to claim 1, further comprising an underlayer, wherein the chin chain is pulled into the underlayer, such that the underlayer prevents injury to a horse during use by a twisting of any of the first members or the second members.

10. The chin chain according to claim 9, wherein the underlayer is of a rubber material.

* * * * *

UNITED STATES PATENT AND TRADEMARK OFFICE
CERTIFICATE OF CORRECTION

PATENT NO. : 7,207,162 B2 Page 1 of 1
APPLICATION NO. : 11/245844
DATED : April 24, 2007
INVENTOR(S) : Karin Deffner It is certified that error appears in the above-identified patent and that said Letters Patent is hereby corrected as shown below:

Title Page; please delete "(73) Assignee: Airbus Deutschland GmbH, Hamburg (DE)".

Signed and Sealed this

Thirtieth Day of October, 2007

JON W. DUDAS
*Director of the United States Patent and Trademark Office*